Jan. 19, 1926.  1,570,267
D. G. MACKENZIE ET AL
ROAD GRADING MACHINE
Filed March 14, 1925      5 Sheets-Sheet 3

Jan. 19, 1926. 1,570,267

D. G. MACKENZIE ET AL

ROAD GRADING MACHINE

Filed March 14, 1925 5 Sheets-Sheet 4

Inventors
D. G. MacKenzie
M. K. Meeker
by Fetherstonhaugh
Attorney.

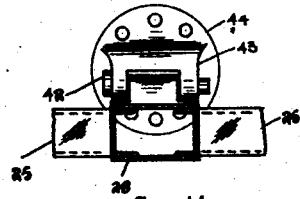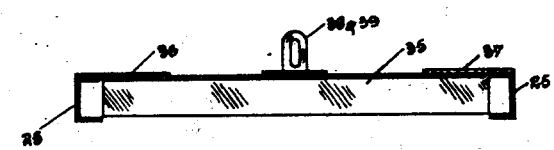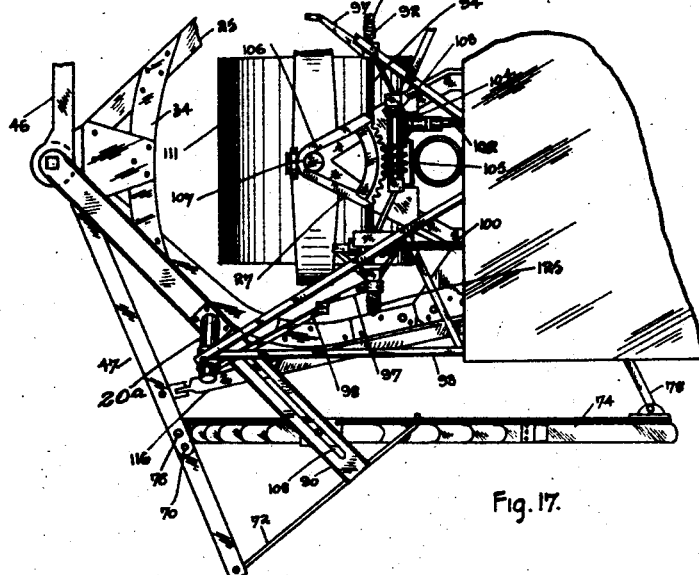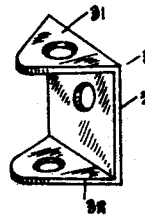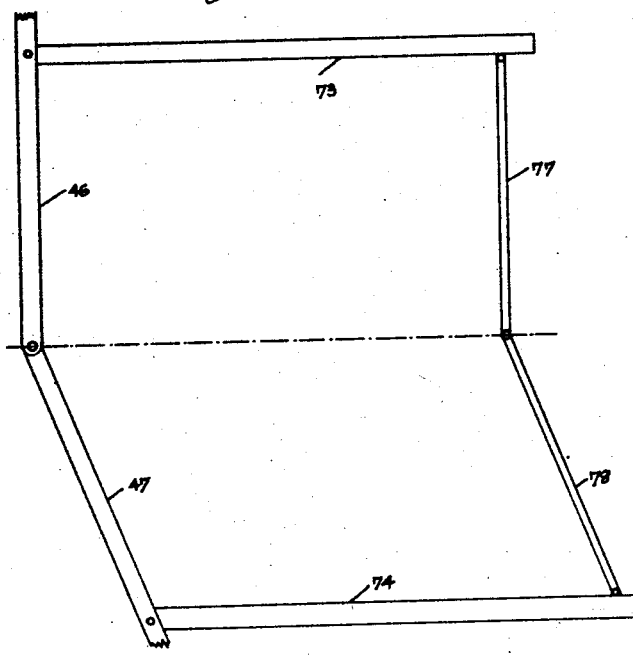

Patented Jan. 19, 1926.

1,570,267

UNITED STATES PATENT OFFICE.

DONALD GORDON MACKENZIE AND MARIUS HONAKER NECKER, OF MONTREAL, QUEBEC, CANADA.

ROAD-GRADING MACHINE.

Application filed March 14, 1925. Serial No. 15,704.

*To all whom it may concern:*

Be it known that we, DONALD GORDON MACKENZIE and MARIUS HONAKER NECKER, both subjects of the King of Great Britain, and residents of the city of Montreal, in the Province of Quebec, in the Dominion of Canada, have invented a new and useful Road-Grading Machine, of which the following is the specification.

The invention relates to a road grading machine, as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to introduce into heavy machines of the roller type surface attacking devices having considerable flexibility, so that the road may not be unnecessarily defaced to facilitate the operations of road machines in maintaining or finishing the surface layers; to insure well kept roadways at a reasonable cost for maintenance; to distribute the pressure in regard to the maintainers and thus reduce the operations required to even the surface; to accomplish the aforesaid purpose with a simple and strong mechanism of comparatively few parts and those of great strength yet readily manipulated; and generally to provide an efficient and durable machine at a reasonable cost of production.

In the drawings, Figure 1 is a side elevation of a road machine, showing the invention attached thereto.

Figure 14 is an enlarged detail of the rear swivel connection.

Figure 15 is a detail of the intermediate suspension device of the frame.

Figure 16 is an enlarged perspective detail of the bearing bracket for the graders and frame.

Figure 17 is a detail of a pressure arm and bracing and control arm.

Figure 18 is a plan view of the parallelograms arrangement in the operation of the graders.

Like numerals of reference indicate corresponding parts in the various figures.

Figure 1:
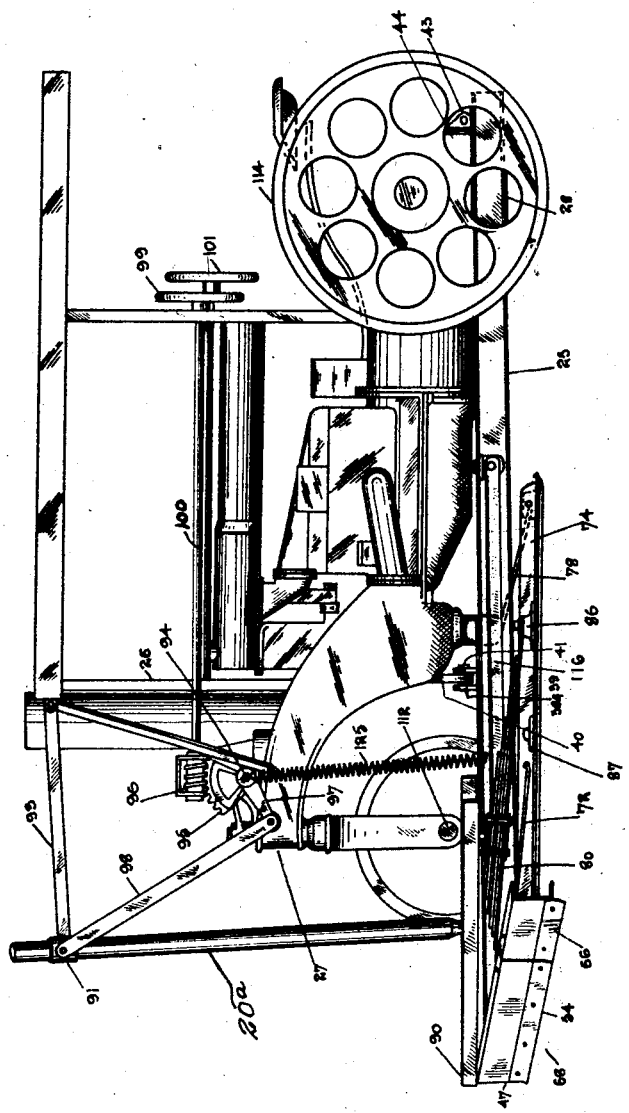
Figure 2:
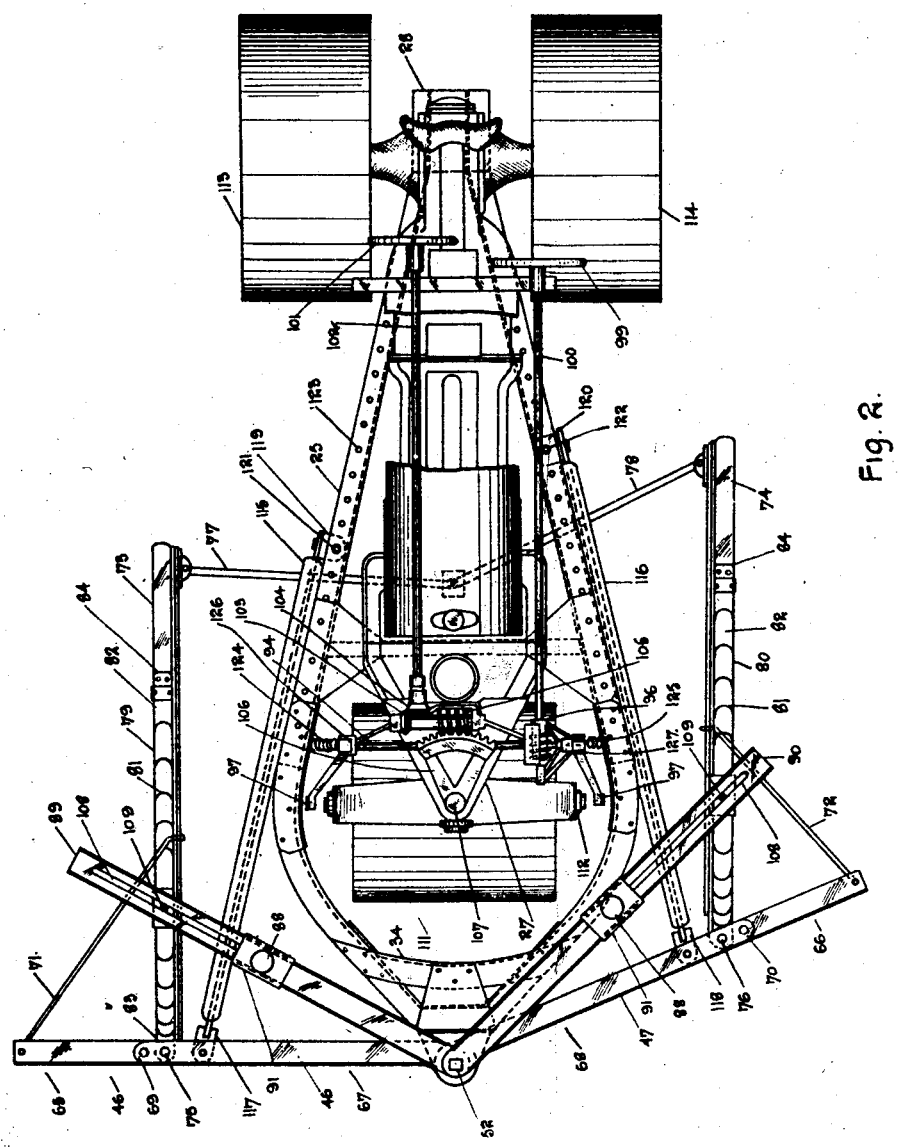
Figure 2 is a plan view of the machine particularly illustrating the invention.
Figure 3:
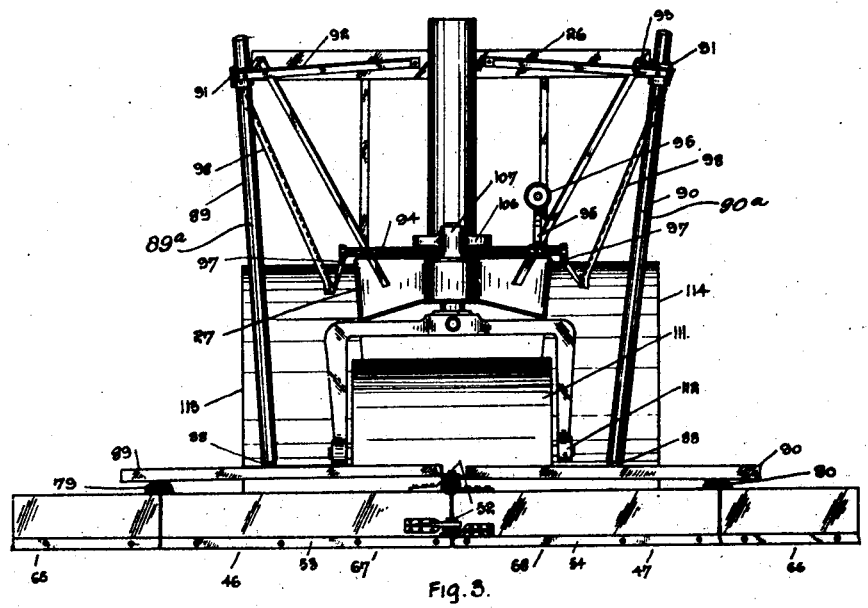
Figure 3 is a front elevation of the machine, showing the pressure distributing mechanism and the maintainers.
Figure 4:
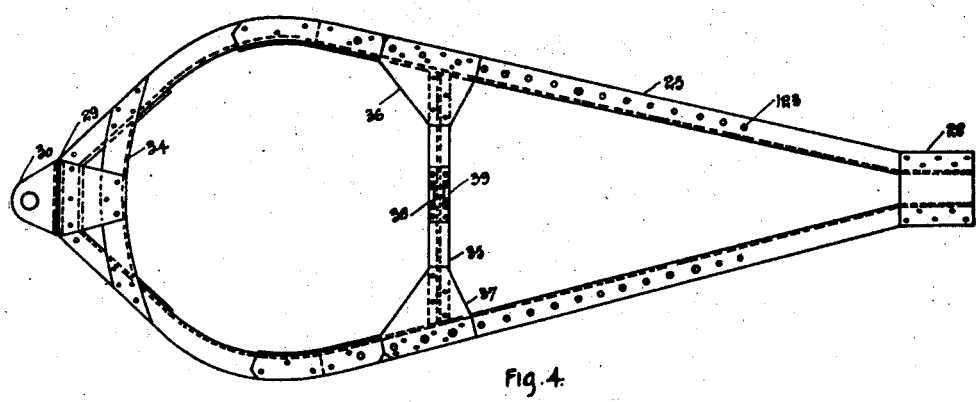
Figure 4 is a detail showing a plan view of the frame.
Figure 5:
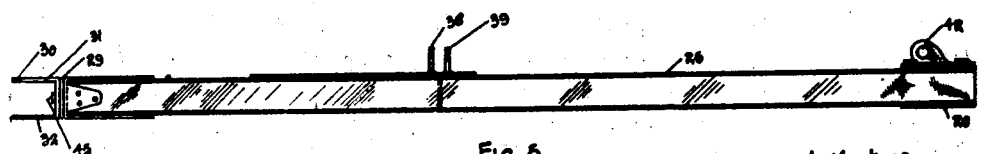
Figure 5 is a detail showing a side elevation of the frame.
Figure 6:
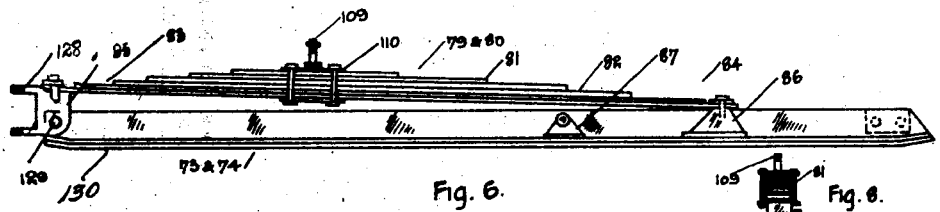
Figure 6 is a detail of a runner showing a side elevation.
Figure 8:
Figure 8 is a detail showing an end elevation of a runner.
Figure 7:
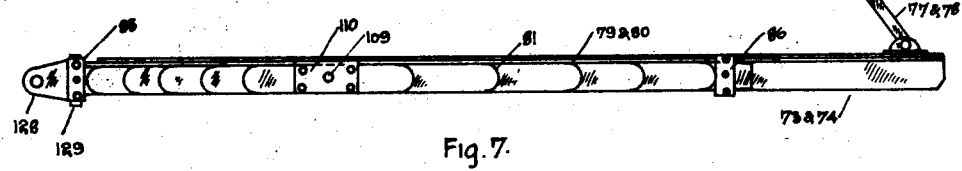
Figure 7 is a detail showing a plan view of a runner.
Figure 9:
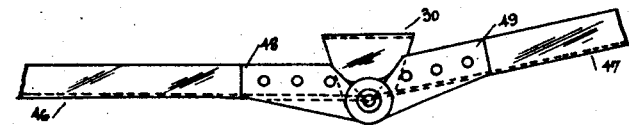
Figure 9 is a detail showing a plan view of the grader broken away.
Figure 10:
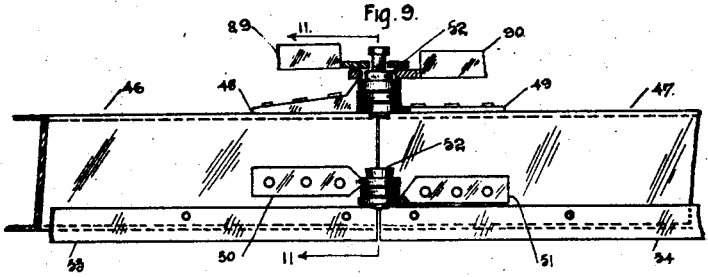
Figure 10 is a detail of the grader showing a front elevation.
Figure 13:
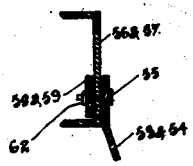
Figure 13 is a cross sectional detail on the line 13—13 in Figure 12.
Figure 11:
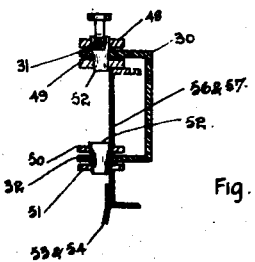
Figure 11 is a cross sectional detail of the grader on the line 11—11 in Figure 10.
Figure 12:
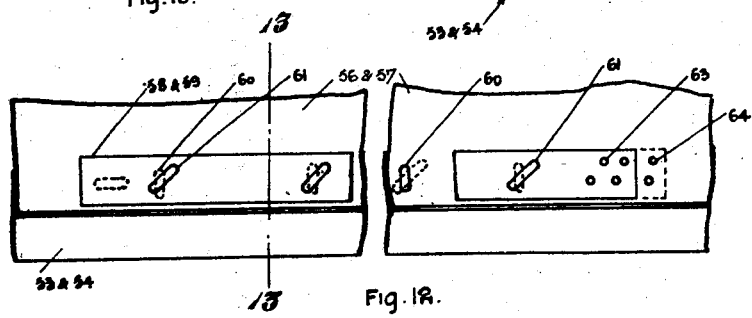
Figure 12 is a fragmentary detail showing the blade adjustment.

Referring to the drawings, the suspension frame 25 carries all the grading mechanism and the body frame 26 and roller machine frame 27 carry the pressure mechanism.

The suspension frame 25 is substantially pear-shape and formed of channel bars extending at their rear end into the bearing plates 28 and at their front ends into the filler plates 29, to which the pivot bearing bracket 30 is secured said bracket having upper and lower flanges 31 and 32 respectively having pin holes for a vertical pin therethrough and a base 33 having a pin hole for a horizontal and longitudinally inserted pin. The filler plates 29 are reinforced by the tie bar 34 riveted to the channel sides of the frame and to said filler plates and another tie bar 35 in T-shape extends from the brackets 36 and 37 secured to said channel sides intermediately in the frame 25 between the bar 34 and the converging end of the frame.

The pivot bearing formed by the parallel lugs 38 and 39 is secured to the T-bar 35 and the slotted suspension bracket 40 is pivotally secured in said lugs 38 and 39 by the pin 41, which has a limited vertical movement in said bracket 40, but is rigidly secured to the machine frame 27, thereby avoiding any lateral shifting of the frame 25, while permitting vertical movement. The frame 25 at the rear end is secured by the pin 42 to the bracket 43 rigidly secured to the differential casing 44 forming part of the roller machine construction, this pin 42 extending through the bearing supported by the bracket 30 thereby hinging the whole frame 25 at the rear end, so that it may swing from said rear pivot bearing upwardly and downwardly to the limit of movements as provided in the intermediate suspension pivot bearings from the T-bar 35.

The pivot bearing bracket is secured by the pin 45 to the front of the frame 25, being secured through the filler plates 29 and itself forming a hinge part for the graders 46 and 47.

The graders 46 and 47 have the hinge parts 48 and 49 secured to the upper portions respectively, the hinge parts 50 and 51 secured towards the lower ends respectively and all of these hinge parts 48, 49, 50 and 51 encircle the pins 52 which are inserted through the flanges 31 and 32 and suitably held therein.

The graders have the cutting blades 53 and 54 secured thereto and from these blades the adjusting plates 58 project through the grader backs 56 and 57 and the adjusting plates 58 and 59 said backs having the vertical pin slots 60 and said adjustment plates having the diagonal slots 61 the pins 55 being rigidly secured to their adjusted positions by the nuts 62 suitably locked. The adjustment plates 58 are moved lengthwise on the backs 56 and 57 in adjusting the height of the blades and securing the desired place of the bolts 63 in sets through bolt holes 64 variously placed in said backs.

The outer end portions 65 and 66 of the graders 46 and 47 are pivotally secured to the inner central portions 67 and 68 by the pivot hinge 69 and 70 respectively, thus these outer end portions are collapsible and may be drawn inwardly at any time for clearance or outwardly held by the radius rods 71 and 72.

The runners 73 and 74 are also secured to the graders 46 and 47 inside the collapsible end portion 65 and 66 and pivotally held by the pins 75 and 76 and at their rear ends are pivotally connected to the machine frame by the anchoring rods 77 and 78 forming with the centre line of the frame 25 parallelograms on both sides, in any position of the graders 46 and 47. The radius rods 71 and 72 are adjustably secured to the runners 73 and 74.

The multiple springs 79 and 80 are built up of the gradually shortening leaves 81 clamped together as customary in this type of spring but having longer overlaps 82 towards one end and thereby grouping the leaves more compactly at the front end or head 83 to strengthen that portion of the spring as compared with the rear end or tail 84, the heads being secured to the front pivot brackets 85 of the runners and the tails being secured to the rear slip bracket 86, a bearing bar 87 extending across each runner intermediately of the length of the tails 84.

The universal joints 88 are secured to the equalizing bars 89 and 90 and particularly to the sleeves 91 centrally secured to said bars 89 and 90.

The tubular arms 89$^a$ and 90$^a$ are tapped internally at the lower ends and screwed on to the joints 88 and extend upwardly in a slightly inclined direction inwardly from either side to bring them within easy operating distance of the body frame 26 and adjacent to the upper ends; each of these tubular arms has an adjustable collar 91 rigidly secured thereto which is universally secured to the brackets 92 and 93 pivoted to the frame 26. The crank shaft 94 is operated by the segmental worm gear 95 and worm 96 and its cranks 97 are secured by the adjustable connecting bars 98 to the collars 91 the gears being operated by the wheel 99 through the rod 100, while the steering of the roller machine is operated by the wheel 101 through the rod 102 gear 103 and 104, worm 105 and segmental gear 106, mounted on the king post 107, this operation as will be seen being quite distinct from the operation of the pressure arms.

The equalizing bars 89 and 90 are preferably channel irons each having a longitudinal slot 108 outwardly beyond the sleeves 91 and through these slots the bars 89 and 90 are mounted on the runners 73 and 74 the pins 109 extending upwardly from the plate bearings 110 projecting through said slots 108 and suitably secured.

The plate bearings 110 are fixedly secured to the clamps of the springs 79 and 80, thus bringing them between the head and tail portions of said springs, from which will result greater initial pressure on the noses of the runners and an evening pressure as the tail portion reaches the intermediate rod bearing.

The equalizing bars 89 and 90 at their inner ends are pivotally secured to the pin 52 and therefore are free to swing with the advancement of the runners 73 and 74 or coincidently with the swing of the graders 46 and 47.

The roller 111, is journaled in the bearings 112, extending from the king post 107 and the rollers 113 and 114 are mounted and driven as usual in tractor machinery and these rollers follow the graders and compress the road material distributed by the action of the graders.

The graders 46 and 47 are adjusted and held to their forward and rear positions by the struts 115 and 116, which are pivotally secured to the lugs 117 projecting from the grader 46 and the lugs 118 from the grader 47, these struts having lugs 119 and 120 respectively fitting into the frame 25 and held by the pins 121 and 122 inserted through holes 123 in said main operating frame.

It may be advisable to further support the frame 25 and this may be accomplished by means of the tension springs 124 and 125 thereby hanging the frame 25 from the crank shaft 94 or any suitable part of the vehicle frame or brackets therefrom.

No mention has been made of clutches for changing the lift or pressure from one side to the other or operating the two sides together in the grading members as this is a common device but to complete the description of the parts it may be said that they are of conventional design and indicated by the numerals 126 and 127.

In the operation of the machine the rollers are driven forwardly as customary in all tractors of the type and the hand wheel 99 is operated and this through the worm 96, gear 95 crank 97 connecting bars 98 tubular arms 89ª and 90ª and runners 73, and 74 lowers the graders 46 and 47 so that the blades 53 and 54 engage the road surface.

This pressure through the hand wheel 99 is continued with the result that the noses of the runners 73 and 74 are dipped because of the greater resistance of the head portions of said springs 79 and 80.

It has been explained that the graders 46 and 47 are pivotally secured to the runners 73 and 74, through the swivel brackets 128 held by the pins 129 therefore the dipping action of the front ends of said runners brings the blades 53 and 54 in digging contact with the road surface in a shaving motion, consequently the inequalities of the road attacked are cut away, but the downward digging movement is limited to the initial attack, for the continued downward pressure on the springs 79 and 80 brings the weaker tail portions into contact with the intermediate bearing bar 87 thus equalizing the resistance of the front and rear portions of the spring and continuing and finishing the cut on parallel lines with the general trend of the road in the longitudinal direction this operation being repeated automatically as each inequality comes in contact with the blades the depth of cut being variable by the operator at any time by variation of applied pressure.

The rollers follow up the levelling of the road and firmly compresses the disturbed material and it makes no difference whether the roadway is simply pitted or rippled, the action of the scrapers or graders will be precisely as described hereinbefore and always at the command of the operator, who presumedly understands the grading of roads.

This machine accomplishes the purposes of the invention largely through the pivotal support and suspension of the main operating frame, which insures flexibility in the movements of the parts and facility in handling the adjustments. It will have been noticed by the description of the details that this main operating frame swings from a rear horizontal pivot and is suspended intermediate of its length in its lowermost position said suspension allowing the frame a vertical movement swinging from the rear.

The roller machine thus drives the cutting members from its extreme rear end, which considerably relieves the fore part of the machine and minimizes the power required for driving purposes, at the same time giving great force in the digging and cutting so that the levelling is done with comparative ease.

The equalizing bars 89 and 90 distribute the spring pressure throughout the graders 46 and 47 without affecting the action on the runners and the effect of the runners on the graders in fact the more forward the position of the graders may be the greater the pressure of the pressure arms on the springs and likewise the lesser the pressure in the rearward positions as the pins from the runners adjust themselves in the slots 108 bringing the runners nearer to the point of pressure on forward movement and moving them away from it on the rearward movement.

The positions of the graders are adjusted by moving them forwardly or rearwardly by means of the struts 115 and 116, which are pinned to the main frame and it will be noticed in this connection that on account of the central pivoting of these graders the individual position of each grader may be chosen to suit the work in hand and this is very useful particularly in cutting and filling and also in the treatment of one part of the road differently from the other part in fact this feature of the machine will undoubtedly be of great service to road experts in construction and repair work and changes may be made in the operating parts and connections to further facilitate the operation should it be found desirable in the operations to do so.

The runners 73 and 74 are made with the renewable shoes 130 and slightly turned up front and rear and will slide over a roadway full of ripples forwardly and backwardly until completely smoothed out, but this is accomplished with great despatch with this machine, because of the exceptional facilities provided in exerting the force from the extreme rear of the vehicle and applying digging pressure only at the moment required and naturally as a consequence relieving that pressure to continue a shaving movement, which is the essential in carrying the operation to a successful finish.

The symmetrical construction of this machine facilitates the road operations and tends towards efficiency in the work done and this does not appear to have been known before.

The collapsible portions of the blades relieve the work considerably when the cut is light as they may be folded back.

Another feature is the adjustability of the blades whereby the wear may be accounted for in the adjustment and many bits carried and changed or adjusted with great rapidity.

It must also be noted that the method of coupling blades to frame avoids twisting and insures longer life to the parts.

What we claim is:—

1. In a road grader, a frame adapted to be secured to the vehicle, a grading mechanism carried by said frame including ground trailers and pressure devices distributing the weight from the front rearwardly on said ground members.

2. In a road grader, a frame adapted to be pivotally and centrally supported at the rear of the vehicle, a grading mechanism carried by said frame including ground trailers and pressure devices distributing the weight from the front rearwardly on said ground members.

3. In a road grader, a frame having front and rear central pivotal bearings and adapted to be pivotally secured at the rear end of the vehicle, a grading mechanism mounted on said front pivotal bearings and including trailing ground members, and pressure devices distributing the weight from the front rearwardly on said ground members.

4. In a road grader, a frame flaring outwardly from a rear pivotal bearing and adapted to envelop a front roller of the vehicle and having central pivotal bearings at the front end, a grading mechanism mounted on said front bearings and including trailing ground members and pressure devices distributing the weight from the front rearwardly on said ground members.

5. A road grader comprising a grading member swinging from a central pivot and having a pusher frame carrying at the front end a bearing for said pivot and at the rear and converging end a bearing for its supporting pivot adapted to secure it to the rear of the vehicle, a ground member and a pressure member acting on said grading member through said ground member independently of said pusher frame.

6. A road grader comprising a grading member in right and left hand sections pivoted centrally and a pusher frame carrying centrally at the front end a pivoted pivot bearing for said sections and at the rear end a pivot bearing adapted to connect the frame to the rear of the vehicle and means for maintaining the said sections to their outer operating positions.

7. A road grader comprising road grading members formed of centrally pivoted arm carrying adjustable blades and having a pusher frame pivotally supported at the rear of the vehicle and flaring outwardly in a forward direction and meeting at the pivot bearing for said arms.

8. A road grader comprising a pair of grading members centrally and commonly pivoted and having extensible sections and a pusher frame unitary with said members in the operation and pushing from the back of the vehicle centrally on said grading members and intermediately on the same through adjustable struts, and brace rods for said extensible sections.

9. A road grader comprising a pair of grading arms having renewable blades and outer extensions similarly equipped and a pusher frame having a central pivot bearing pivoted thereto at the front end and extending out from said bearing and gradually tapering to a rear horizontal pivotal bearing at the rear of the vehicle, ground members flexibly secured to said arms, struts from said frame to said main arms, and brace rods from said ground members to said extensions.

10. A road grader comprising a grader member having a pusher frame carrying a pivot bearing, a longitudinal pivot securing said bearing to the frame, a vertical pivot in said bearing securing said member to its pusher frame and a rear horizontal pivot securing said frame to the vehicle.

11. A road grader comprising a grader member swinging horizontally from the front of a pusher frame, a flanged pivot bearing upper and lower flanges extending outwardly from a back and pivotally secured through the latter to a bracket in said frame, a pivot through said flanges securing said member to said frame through said pivot bearing, a strut adjustably holding said member from said frame and a rear horizontal pivot joint supporting said frame from the vehicle.

12. A road grader comprising a pair of grading arms carrying renewable blades and operating outwardly from a common central pivot secured in a pivot bearing pivotally secured to the pusher frame forming a unit with said grading member, running ground members attached to said grading members, pressure bars pivotally secured on the aforesaid pivot above said arms and to said ground members and pressure arms engaging said bars.

13. In a road grader, a frame suitably supported from the vehicle grading members pivotally supported from the front of said frame and having folding outer sections, struts pivotally secured to the inner sections of said grading members and adjustably attached to the frame and radius rods bracing said outer sections.

14. In a road grader, a frame hinged to the rear of the vehicle and having an intermediate tie bar adjustably suspended from said vehicle, a bracket in the form of a tie bar at the front end of said frame and filler plates rigidly secured thereto and forming a pivot bearing, a pivot bracket having upper and lower flanges a pin securing said pivot bracket to said frame, a pair of grading members, a pin securing said grading members to said pivot bracket and struts holding said grading members outwardly from the frame.

15. In a road grader, a frame suitably supported from the vehicle and having a pivot bearing at the front end, a pair of grading members mounted on said pivot bearing and extending outwardly therefrom on either side, a pair of runners pivotally secured at the front ends to said grading members, struts adjustably holding said grading members and means for exerting pressure on said runners.

16. In a road grader, a grading mechanism, runners pivotally secured thereto, a frame from the vehicle secured to said grading mechanism and means including a leaf spring for exerting pressure on said runners to depress the noses thereof and immediately thereafter distribute the pressure along said runners.

17. In a road grader, a frame suitably secured to the vehicle, grading members pivotally secured to said frame, runners pivotally secured to said grading members, means for exerting pressure on the runners and anchoring rods securing the rear ends of said runners to said frame and forming with a center line through the frame constant parallelograms notwithstanding the change in positions of the grading members.

18. In a road grader, a frame secured to the vehicle, a pair of grading members pivotally secured to the front of the frame, runners pivotally secured to and extending rearwardly from said grading members, springs secured to the fore ends of said runners and means for exerting pressure on said springs to initially dip the noses of the runners.

19. In a road grader, a pair of runners, multiple leaf springs having comparatively weak rear portions, permanent bearings below said weak portions, a pair of graders engaging said runners, a frame and means for exerting pressure on said springs.

20. In a road grader, a pair of runners having springs in leaf form stronger at the front ends and extended at the other ends to weaken the pressure at the initial movement, bearing rods intermediately of said weak portions, a pair of grading members secured to said runners and means for exerting pressure towards the front portion of said springs for initially dipping the noses of said runners.

21. In a road grader, a frame connected with the vehicle, a grading member, a runner secured to said grading member, a pivoted equalizing bar having a slip connection with said runner and means for bringing pressure on said bar to bear on said runner.

22. In a road grader, a pusher frame connected with the vehicle spreading frontwardly and carrying a universal bearing, a pair of grading members universally secured at the front of said frame, a pair of runners pivotally secured to said grading members, a pair of equalizing bars pivoted with said grading members and extending over said runners and means for exerting pressure on said runners through said bars.

23. In a road grader, a frame connected with the vehicle having a central pivot bearing at the front end thereof, a pair of equalizing arms mounted on said pivoted bearing and having a longitudinal slot therein, a pair of grading members swinging from said pivot, a pair of runners pivotally secured to said grading members and extending rearwardly therefrom and spring cushions thereon, said cushions having plate bearings thereon and pins projecting upwardly from said plates through said slots, and means for bringing pressure on said equalizing bars.

24. In a road grader, an operating frame, a central pivot bearing at the front end thereof, a pair of grading members swinging outwardly from said pivot, a pair of slotted equalizing bars extending from the said pivot, a pair of runners pivotally secured to said grading members and having spring bearing rods at the front, rear and intermediately, a multiple spring on each runner having greater resistance at the front portion and pins projecting upwardly through said slotted bars and means for bringing pressure on said springs through said equalizing bars 25. In a road grader, a multiple leaf spring built up compactly at the front end and having extended overlaps on the rear portion and clamped between the strong and weak portion, a runner having front and rear pivot bearings for said spring and an intermediate seat therefor to maintain the equilibrium of the runner, a grading member secured to said runner and means for bringing pressure on said spring between the strong and weak portions.

26. In a road grader, a tapering frame from front to rear of the vehicle, a plurality of bars and rods swinging outwardly from said frame, on either side and forming grading members, equalizing bars and anchoring rods, runners secured thereto and pressure members flexibly connected to said equalizing bars and through the latter bearing on said runners.

27. A road grader comprising a pair of grading members and a supporting frame pivotally secured to the mechanism of the vehicle at the rear end and carrying said arms in a pivotal bearing at the front end, a pair of pressure bars mounted on said pivotal bearing, runners flexibly secured to said grading members and engaged by said pressure bars, a pair of pressure arms flexibly connected with said bars and projecting upwardly and supported from vehicle frame, and a crank mechanism connected through tension arms to said pressure arms.

28. In a road grader, a vehicle frame, two pressure arms having adjustable collars thereon flexibly secured to said frame, adjustable tension rods from said collars, cranks pivotally secured to said tension rods, a crank shaft mounted in said vehicle frame and operating rods and gear therefrom, a frame, pressure bars secured to the vehicle frame, grading members secured to said frame, runners secured to said grading members and bars engaged by said pressure arms to exert pressure on said runners.

29. In a road grader, a vehicle frame, a pair of pressure arms flexibly supported from said frame at their upper ends, a pair of pivoted grading members and runners therefrom, a frame supporting said grading members, pressure bars engaged by said arms and a manual control operatively connected with said pressure arms to bear on said runners through said bars.

30. In a road grader, a vehicle frame, a pair of pressure arms flexibly supported from said frame, a crank mechanism and hand operating gear operatively connected to said pressure arms, a pusher frame having a front pivot bearing and at the rear pivotally secured to the vehicle, a pair of grading members mounted on said front pivot bearing and runners therefrom and pressure bars mounted on said front pivot and extending to said runners and having a universal connection to said pressure arms.

31. In a road grader, a vehicle frame, a pair of pressure arms suitably supported from said frame, crank shafts and worm gears, a coacting worm and operating rod, connecting rods to said pressure arms from said crank shaft, a pair of pivoted grading members and runners therefrom, springs mounted on said runners, equalizing bars pivoted with said grading members and having slip connections with said runners, universal joints carried by said bars and forming the flexible connections to said pressure arms, and a suspended and pivoted frame carrying said grading mechanism.

32. In a road grader, a blade having bolts extending therethrough, a bar having vertical slots through which said bolts extend and an adjusting and locking plate slidably arranged on the inner side of said bar and adapted to be rigidly secured at one end to bar and said blade on its adjusted position.

33. In a road grader, a channel bar having vertical slots, a blade having horizontal slots centrally crossing said vertical slots, an adjusting and locking plate having diagonal slots intersecting said vertical slots and sliding on the bed of said channel bar, bolts extending through said slots and bolts rigidly securing the three plates together to the adjusted position.

34. In a road grader, a vehicle forming a road tractor and having driven rear rollers and a central front steering roller, a bracket secured to the rear driving mechanism, an operating frame embracing the front roller and converging between the rear rollers and pivotally secured in said bracket, an intermediate suspension member engaging said frame, a pivot bearing bracket pivotally supported at the extreme front end of said frame, a pair of grading members pivotally mounted in said pivot bearing bracket and swinging outwardly, a pair of equalizing bars mounted on the same pivot, runners extending from said grading members and carrying spring cushions supporting said equalizing bars, in slip connections, struts extending from the grading members to the frame and adjustable on the latter, pressure arms connected through universal joints to said equalizing bars and crank and gear to said pressure arms.

35. In a road grader, a ground member formed of an angle bar and a tread bar secured to the horizontal section of said angle bar and removable therefrom for renewal, lugs at the front and towards the rear ends of said angle bar forming spring fastenings, an intermediate bearing member, and a spring secured to said fastenings and extending at one end over said bearing.

36. In a road grader, a grading mechanism including blade and runners the latter having swivel brackets at the front ends connected to the runners by horizontal pins, said brackets having lugs for vertical pins connecting them to the blades.

37. In a road grader, a pair of blades extending outwardly from a universal bearing and swinging independently from a frame supported from the vehicle, adjustable struts holding said arms from said frame at the desired angle respectively and means on either side having similar parts and adapted to operate said blades for attacking the road.

38. In a road grader, a grading mechanism including a pair of blades centrally pivoted and having collapsible end portions adapted to fold backwardly to shorten the operating blade for lighter work and for clearance in travelling and adjustably attached struts and brace rods holding the main and end parts respectively to their work.

39. In a road grader, a frame having a central front pivot bearing in channel bar form, a pair of channel bars having upper and lower hinges pinned in said bearings, and blades adjustably secured to said channels below the lower hinges.

40. In a road grader, a pair of grading members having blades secured thereto, a pusher frame adapted to be supported at the rear of the vehicle, pressure members operatively connected to said grading members, a crank shaft connected to said pressure members and having operating means extending therefrom, tension springs from said crank shaft to said pusher frame, one on either side, adapted to ease the operation in lifting the grading members, and means for guiding said frame in its vertical movements.

41. In a road grader, a pair of grading members having blades secured thereto, a pusher frame adapted to be supported at the rear of the vehicle, pressure members operatively connected to said grading members, a crank shaft connected to said pressure members and having operating means extending therefrom, tension springs from said crank shaft to said pusher frame, one on either side, adapted to ease the operation in lifting the grading members and parallel lugs from the pusher frame engaging the guide thereabove.

42. A road grading machine comprising a vehicle frame and rollers forming the running gear, a frame extending from between the rear rollers around and about the front roller and having a universal bearing at the front end and a pivot bearing from the vehicle at the rear, a pair of grading arms secured in said universal bearing, and means for applying pressure on said arms.

43. A road grading machine comprising a vehicle having compressing rollers and pressure gearing and control mechanism, and means for cutting and evening the road in advance of the rollers including individually and collectively controlled graders and a frame hinged and pushed from the rear of the vehicle and adjustably supported intermediately and carrying said graders and runners attached to the latter and dipped to cause the entry of blades in advance of said rollers by pressure through equalizing members.

44. A road grading machine comprising a vehicle having compressing rollers and pressure gearing and control mechanism and means for cutting and evening the road in advance of the rollers including individually and collectively controlled graders and an operating frame having a bearing bracket for said graders attached by a horizontal and longitudinal pivot to the front thereof and a vertical pivot securing said graders and forming above the bracket a journal for equalizing bars pressed on runners pivotally secured to the graders.

45. A road grading machine comprising a vehicle having compressing rollers and pressure gearing and control mechanism and means for cutting and evening the road in advance of the rollers including individually and collectively controlled graders, and a pusher frame attached to the rear of the vehicle at the contracted end by a hinge having a comparatively wide bearing in a bracket secured to the differential casing and suspended intermediately by pivot bracket and side springs, said frame carrying all the grading mechanism.

46. In a road grader, a grading mechanism having a pair of arms, carrying blades pivotally secured to the front centre of a pear shaped frame in a bearing itself pivoted in the frame and held from the receding sides of said frame by struts movable from hole to hole in said sides, said sides converging from either side to a bearing closing the rear end and adapted to be secured to the vehicle.

47. A road grader, comprising a grading mechanism formed of a pair of cutting members normally resting on the road and pivotally secured at their inner ends and swinging outwardly from the central pivot bearings to either side and a pusher frame carrying a universal pivotal bearing centrally at its wide front end for said cutters and tapering from said front end to a rear pivotal bearing and swinging upwardly and downwardly therefrom and moving free of the influence of the front bearing and vertically guided in the centre and spring supported on either side intermediately of the front and rear bearings.

Signed at Montreal, Canada, this 24th day of February, 1925.

DONALD GORDON MACKENZIE.
MARIUS HONAKER NECKER.